United States Patent [19]
Boskovic

[11] Patent Number: 4,929,170
[45] Date of Patent: May 29, 1990

[54] EJECTOR BLADE

[76] Inventor: Borislav Boskovic, 2102 Bannockburn, Inverness, Ill. 60067

[21] Appl. No.: 343,676

[22] Filed: Apr. 27, 1989

[51] Int. Cl.⁵ .............................................. B29C 45/40
[52] U.S. Cl. ..................................... 425/556; 249/67; 249/68; 425/436 R; 425/438; 425/444
[58] Field of Search .................... 425/554, 556, 436 R, 425/436 RM, 438, 441, 444, 422; 249/67, 68

[56] References Cited

U.S. PATENT DOCUMENTS

| | | | |
|---|---|---|---|
| 3,794,287 | 2/1974 | Atkinson | 249/106 |
| 3,852,011 | 12/1974 | Maiocco | 425/444 |
| 3,900,183 | 8/1975 | Wallace | 425/444 |
| 4,162,138 | 7/1979 | Byrne | 425/436 R |
| 4,452,420 | 6/1984 | Lundquist | 249/68 |

Primary Examiner—Jay H. Woo
Assistant Examiner—Timothy W. Heitbrink
Attorney, Agent, or Firm—Lee, Mann, Smith, McWilliams & Sweeney

[57] ABSTRACT

An ejector blade for ejecting parts from injection molds. The ejector blade has an elongate shank portion with a slotted end therein, a flat blade portion having an end shaped to be engaged within the slot, and apertures through the engaged ends in registration with one another with a pin engaged in the apertures to join the shank and blade portions releasably so that different blade portions can be mounted on the shank portion. The pin is a slotted roll pin and the aperture in the shank portion is larger in diameter than the aperture in the blade portion in order to permit some movement between the blade and shank portions to accommodate variations in a mold in which the ejector blade is used.

17 Claims, 1 Drawing Sheet 4,929,170

EJECTOR BLADE

BACKGROUND OF THE INVENTION

This invention relates to plastic injection molds, and in particular to an ejector blade assembly for ejecting plastic parts from the mold after a part has been formed.

Ejector pins are common parts of plastic injection molds. Pins of various sizes and shapes are used to help remove parts from a mold as the mold cavity is opened. Typical ejection pins are illustrated in U.S. Pat. Nos. 3,794,287; 3,852,011; 3,900,183 and 4,162,138.

While ejector pins, whether round, flat or otherwise shaped, are effective in normally ejecting plastic parts from a mold, they do suffer deficiencies. First, because pins are a unitary part, the injection molder must stock a large quantity of pins of different sizes, lengths and configurations in order to accomodate different molded parts. Secondly, because the pins are single piece structures, they are quite rigid, and any variations in a mold, whether it is due to improper tolerances or unequal expansion of one mold part relative to the other, cannot be accomodated by a pin. Such variations often lead to bending or breaking of the pins, requiring their replacement.

SUMMARY OF THE INVENTION

The present invention overcomes the above deficiencies of the prior art, and others, by providing an ejector blade for a plastic injection mold which comprises a series of parts, namely an elongate shank portion, a blade portion, and means releasably joining the shank portion to the blade portion at the ends thereof, so that different blade portions can be mounted on a given shank portion.

In accordance with the preferred form of the invention, the shank portion includes a slot at one end which is shaped to accomodate the generally flat blade portion. The means releasably joining the two portions comprises an aperture in one end of each of the portions, with the apertures being in registration with one another, and a pin engaged through the apertures to join the shank portion and the blade portion.

It is preferred that the pin comprise a slotted roll pin. Also, it is preferred that the aperture in the shank portion be larger in diameter than the aperture in the blade portion (or vice versa), so that there is some inherent flexibility of alignment between the blade portion and the shank portion.

The shank portion is generally round in cross section and has a given diameter, and the blade portion is generally flat and has a width substantially equal to the diameter of the shank portion, with the blade portion being formed to be accomodated snugly in the slot of the shank portion. Blades of differing lengths can be secured to one shank, while shanks of differing lengths can be used with a blade of a particular length, providing substantial versatility to the ejector blade.

BRIEF DESCRIPTION OF THE DRAWING

The invention is described in greater detail in the following description of an example embodying the best mode of the invention, taken in conjunction with the drawing figures, in which.

DESCRIPTION OF AN EXAMPLE EMBODYING THE BEST MODE OF THE INVENTION

Figure 1:
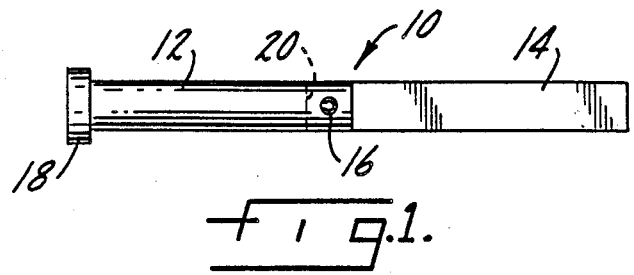
FIG. 1 is a side elevational illustration of an ejector blade according to the invention.
Figure 5:
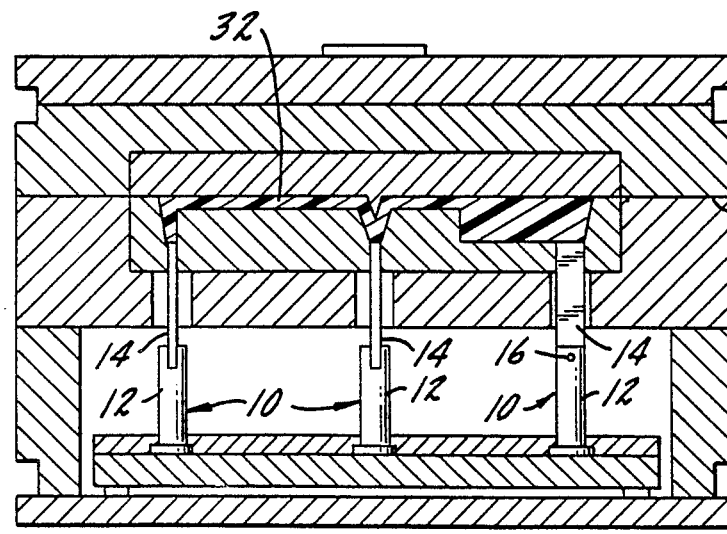
FIG. 5 is a cross-sectional view, partially in elevation, showing a typical application of three ejector blades according to the invention when installed in a plastic injection mold for ejecting a plastic part therefrom.

An ejector blade according to the invention is shown generally at 10 in FIGS. 1 and 5. The ejector blade includes, as primary components, a shank portion 12, a blade portion 14, and a pin 16 which releasably joins the blade portion 14 to the shank portion 12.

Figure 2A:
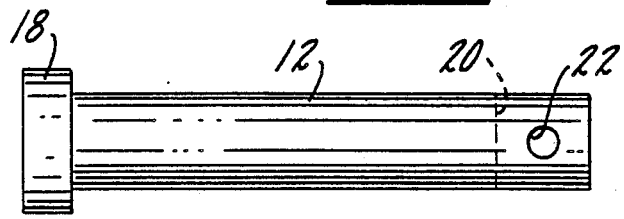
FIG. 2A is an enlarged elevational view of the shank portion of the invention.
Figure 2B:
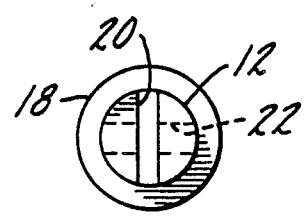
FIG. 2B is an end view of the shank portion of FIG. 2A.

The shank portion 12 is generally circular in cross section, and includes an enlarged, circular head 18 at one end which can be gripped in an appropriate location in a plastic injection mold. At the other end, the shank portion 12 includes an axial slot 20, centrally located as shown in FIG. 2B. A lateral aperture 22 is bored through that end of the shank portion 12.

Figure 3A:
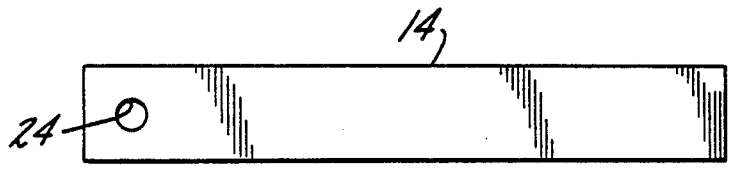
FIG. 3A is an enlarged elevational view of a blade portion according to the invention.
Figure 3B:
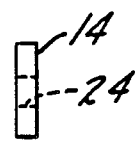
FIG. 3B is an end view of the blade of FIG. 3A.

The blade portion 14 is an elongated structure, generally flat, as shown in FIGS. 3A and 3B, and includes an aperture 24 at one end which is formed to be in alignment with the aperture 22 such that the blade portion 14 is snugly held within the slot 20 when the ejector blade 10 is in the assembled form shown in FIG. 1.

Figure 4A:
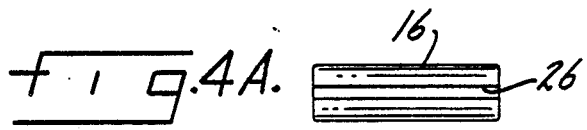
FIG. 4A is a further enlarged view of a roll pin according to the invention for joining the blade portion to the shank portion.
Figure 4B:
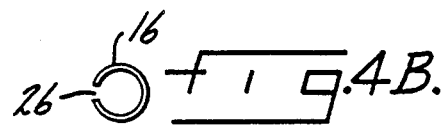
FIG. 4B is an end view of the roll pin of FIG. 4A.

The pin 16, as shown in FIGS. 4A and 4B, is preferably a roll pin having a longitudinal gap or slot 26. The gap 26 allows the pin 16 to be compressed slightly, providing inherent flexibility.

It is preferred that the aperture 22 is slightly larger in diameter than the aperture 24, with the pin 16 being sized to fit snugly within the aperture 24 so that some slight movement is possible between the ejector blade 14 and the shank portion 12 in order to accomodate mold variations, as discussed above. Alternatively, the aperture 24 can be larger than the aperture 22 to accomplish the same result. In addition, because the pin 16 is a roll pin, even if the apertures 22 and 24 are of equal diameters, the compressability of the pin 16 inherently allows some flexibility of orientation between the blade portion 14 and the shank portion 12, while still rigidly joining the blade portion 14 to the shank portion 12.

Deployment of several ejector blades 10 according to the invention is shown schematically in FIG. 5, the blades being utilized in a plastic injection mold 28 which divides along a separating line 30. A plastic part formed within the mold 28 is shown generally at 32 in FIG. 5. As the cavity of the mold 28 is opened, in a conventional fashion each of the three ejector blades 10 illustrated in FIG. 5 bears against the plastic part 32, ejecting the plastic part from the mold 28 when the mold cavity has opened sufficiently. The mold 28 is then closed, additional plastic is injected in the mold to form another part 32, and the ejection process is repeated.

The ejector blade 10 according to the invention is quite versatile. A single shank portion 12 can accomodate many different blade portions 14 of varying lengths. Conversely, a single blade portion 14 can be accomodated in various shank portions 12 of different lengths. Thus, a mold operator need only have an inventory of shank portions 12, blade portions 14, and pins 16, in order to assemble an appropriate ejector blade of a desired length and nature.

It is preferred that the diameter of the shank portion 12 be substantially equal to the width of the blade portion 14, and that all of the parts of the ejector blade 10 be formed of suitable steel of sufficient strength to withstand the rigors of an ejection molding process. Various changes can be made, however. For example, although a slot 20 has been shown as the preferred form of the invention, the metal material on one side of the slot 20 can be eliminated, without substantially affecting the utility of an ejector blade, although such blade will have a bit more possible movement between the blade portion 14 and the shank portion 12 due to the elimination of the slot 20. Various other changes may be made to the invention without departing from the spirit thereof or scope of the following claims.

What is claimed is:

1. An ejector blade for a plastic injection mold, the ejector blade comprising
   a. an elongated shank portion,
   b. a blade portion having a first end extending from one end of said shank portion, and
   c. means releasably joining said shank portion to said blade portion at said ends so that a different blade portion can be mounted on said shank portion, said means releasably joining comprising a transverse aperture in said first end of said blade portion, a transverse aperture in said one end of said shank portion, said apertures being in registration with one another, and means engaged in said apertures to flexibly join said portions.

2. An ejector blade according to claim 1 in which said shank portion includes a slot at said one end shaped to accomodate said blade portion.

3. An ejector blade according to claim 2 in which said means flexibly joining said portions comprises a pin engaged in said apertures to join said portions.

4. An ejector blade according to claim 3 in which said pin comprises a slotted roll pin.

5. An ejector blade according to claim 3 in which said aperture in said shank portion is larger in diameter than said aperture in said blade portion.

6. An ejector blade according to claim 3 in which said aperture in said blade portion is larger in diameter than said aperture in said shank portion.

7. An ejector blade according to claim 2 in which said shank portion is generally round in cross section and has a given diameter, and said blade portion is generally flat and has a width substantially equal to said diameter, said blade portion being formed to be accomodated snugly in said slot.

8. An ejector blade according to claim 1 in which said means flexibly joining said portions comprises a pin engaged in said apertures to join said portions.

9. An ejector blade according to claim 8 in which said pin comprises a slotted roll pin.

10. An ejector blade according to claim 8 in which said aperture in said shank portion is larger in diameter than said aperture in said blade portion.

11. An ejector blade according to claim 8 in which said aperture in said blade portion is larger in diameter than said aperture in said shank portion.

12. An ejector blade for a plastic injection mold, the ejector blade comprising
    a. an elongated shank portion which is generally round in cross section,
    b. an elongated blade portion which is generally flat, a first end of said blade portion being shaped to be engaged in and extend from one end of said shank portion to form said ejector blade, and
    c. means releasably joining said shank portion to said blade portion at said ends so that a different blade portion can be mounted on said shank portion, said means releasably joining comprising a transverse aperture in said first end of said blade portion, a transverse aperture in said one end of said shank portion, said apertures being in registration with one another, and means engaged in said apertures to flexibly join said portions.

13. An ejector blade according to claim 12 in which said means flexibly joining said portions comprises a pin engaged in said apertures to join said portions.

14. An ejector blade according to claim 13 in which said pin comprises a slotted roll pin.

15. An ejector blade according to claim 13 in which said aperture in said shank portion is larger in diameter than said aperture in said blade portion.

16. An ejector blade according to claim 13 in which said aperture in said blade portion is larger in diameter than said aperture in said shank portion.

17. An ejector blade according to claim 12 in which said blade portion has a width and said shank portion has a given diameter, said width being substantially equal to said diameter.

* * * * *